Aug. 4, 1931.  E. C. HOPKINS  1,817,373
CONVEYER
Filed Oct. 19, 1928   2 Sheets-Sheet 1
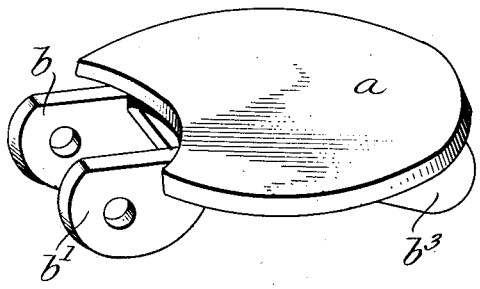
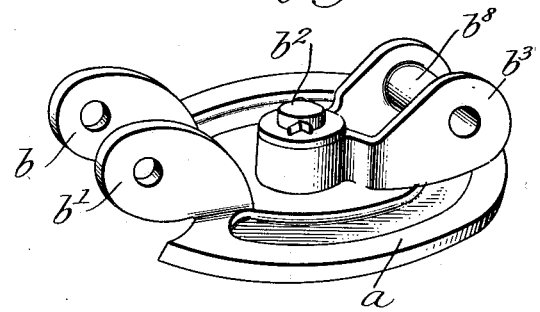
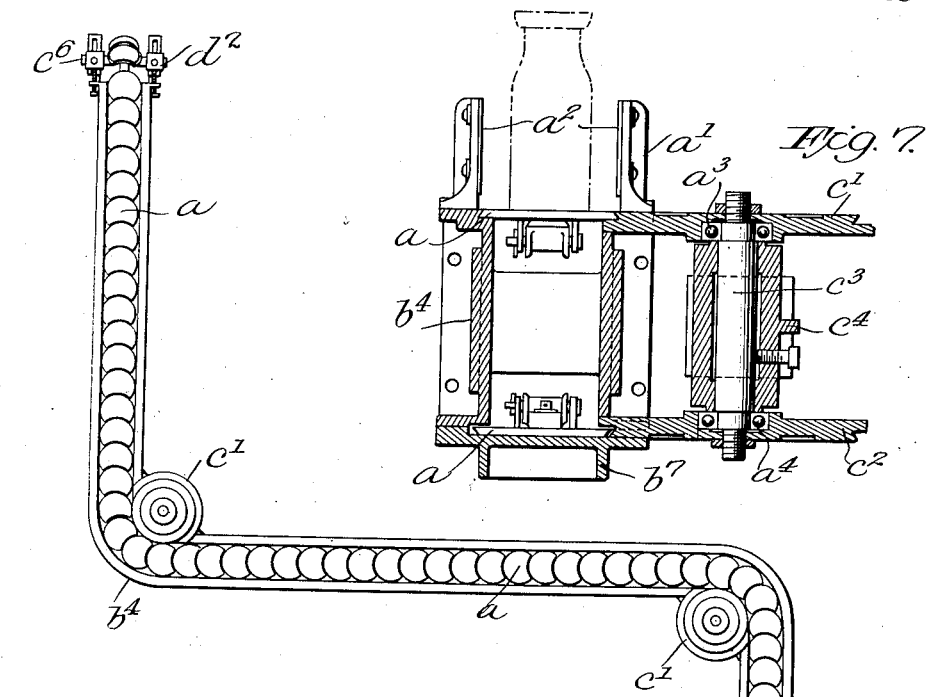
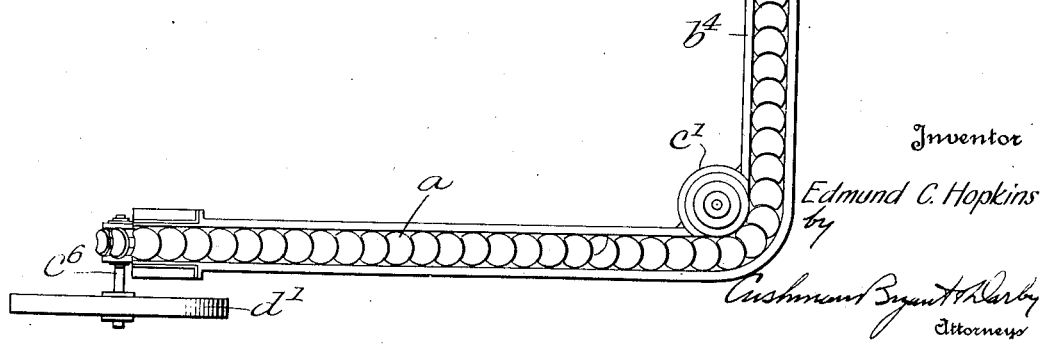
Inventor
Edmund C. Hopkins
by
Cushman, Bryant & Darby
Attorneys

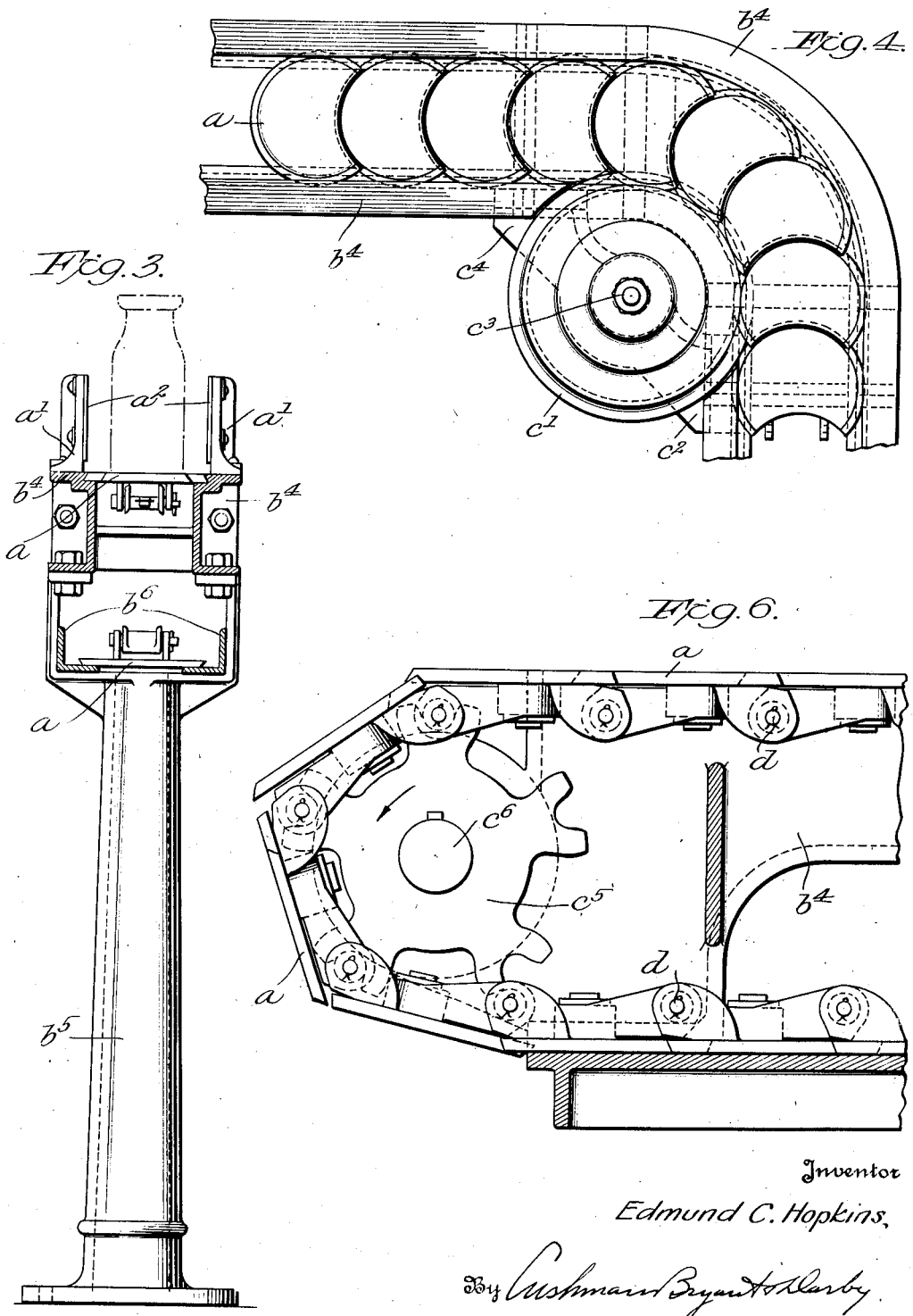

Patented Aug. 4, 1931

1,817,373

UNITED STATES PATENT OFFICE

EDMUND CHARLES HOPKINS, OF LONDON, ENGLAND

CONVEYER

Application filed October 19, 1928, Serial No. 313,533, and in Great Britain October 31, 1927.

This invention relates to improvements in or relating to conveyers, and the object of my invention is to provide means whereby conveyers are adapted to travel around corners, that is to say at right angles, and at the same time to convey the articles required to be conveyed, such for example as bottles, without any assistance being necessary in connection with the articles carried.

The conveyance of the articles in accordance with my invention is carried into effect by a series of links each being provided with a flight or conveyer member of a disc formation, each disc having a portion cut out in the form of an arc in such a way that the periphery of one disc will ride in, and partially rotate in the cut-out portion of its companion conveyer member or flight on an adjacent link. The links are connected together so as to allow of a hinging action, this being effected by means including a bracket which is adapted to one of the disc members in such a way that the disc member may have axial movement or semi-rotation, the said bracket being attached to a companion disc by means of another bracket, the two brackets being secured together by means of a pin which allows the bracket and discs to rotate about the said pin. Secured or formed with the disc members may be a steel or other plate which in conjunction with a hub of the bracket of one of the discs constitutes a means for driving the conveyer through a sprocket wheel, the teeth of which engage between the said parts.

As will be understood, there may be any number of the disc conveyer members according to the length of the conveyer table required.

In the application of these disc conveyer members to a machine, I may proceed as follows:—

A suitable framework is provided, on which the flights or conveyer disc members travel. At one end of the conveyer table there may be a sprocket wheel suitably driven by a motor, direct coupled or belt driven, or other means, and this sprocket wheel imparts a travelling motion to the disc members. Say, for example, the machine has one leg and at right angles thereto another leg, and at right angles still a further leg, and at right angles yet another leg, making somewhat of an elongated frame; at each of the three corners of the said frame is a wheel slightly bevelled. This wheel is mounted on a vertical axis and at the bottom of the axle carrying the said wheel is a further wheel, or pulley part, also having on its top flange a bevel. The frame on which the conveyer travels may have at each side an undercut portion bevelled downwards, but this is not absolutely necessary. The discs comprising the actual conveyer are bevelled on their periphery and also in the arc cut-away portion, in such a way that the bevelling is adapted to ride under the bevelling of the frame and under the bevelling of the roller. The object, in particular with regard to the roller and the bevelling of the disc shaped conveyer, is to prevent the discs rising when they go round the corners, and by virtue of the discs being cut away in arc formation they adjust themselves by partially rotating on their vertical axes, when going around corners, and further in a conveyer of this kind, which is of the endless description, the disc conveyer is adapted to follow around the sprocket wheel or guide wheels, as the case may be.

When a bottle or other article is placed on the conveyer, there is no centrifugal force exerted at the corners to throw the bottle or other article off the conveyer, as it will be understood that the bottle or article rotates partially in the same manner as the disc of the conveyer does when going round a corner.

In order that my invention may be more clearly understood, reference is made to the accompanying drawings in which:—

Fig. 1 shows a perspective view of one link or disc;

Fig. 2 shows a perspective view of the underside of the parts shown in Figure 1;

Fig. 3 shows a typical sectional elevation of the framework for carrying the conveyer, and a suitable support for same;

Fig. 4 shows a plan of one corner of the framework;

Fig. 5 shows a general plan of a typical outlay of the conveyer;

Fig. 6 shows a sectional elevation of the driving end of the conveyer, and

Fig. 7 shows a sectional elevation taken at one of the corners of the conveyer.

My invention relates to a new or improved conveyer of the link or chain type, in which the said link or chain is adapted to travel around corners and carry the load on a platform portion of the links of the chain which is suitably carried in the frame, the link of the chain forming the conveyer proper being driven by direct contact with a driven sprocket wheel, substantially as described and shown in the accompanying drawings. The new or improved conveyer comprises a series of links each including a disc with bevelled edges, each disc having a portion cut out in the form of an arc, in such a way that the periphery of one disc will ride in, and partially rotate, in the cut-out portion of the disc of a companion link, to which it is pivoted on a vertical axis by means of a compound connecting piece which also allows the disc to partially rotate on a horizontal axis. The new or improved connecting pieces are each formed with projecting lugs, each of which is provided with a pivoted member, pivoted at its forward end to its companion link, a boss of the said pivoted member forming the drive in connection with the driving sprocket wheel of the conveyer frame. The conveyer proper is carried by a suitable framework arranged with idle bevelled guide wheels, adapted to receive the bevelled discs of the links of the said conveyer proper at the turning points of the conveyer.

In carrying out my invention I may proceed as follows:—Referring to Figs. 1 and 2, I provide a plate $a$, having bevelled edges with two suitable lugs such as $b$ $b^1$ and a spindle $b^2$. On to this said spindle $b^2$ is mounted a connecting member $b^3$, in such a way that it may have a horizontal movement about a vertical axis. This member $b^3$ is so formed that it has a boss $b^8$ thereon, said boss $b^8$ constituting, in conjunction with a suitable toothed wheel, the means for driving the conveyer.

In order to form a chain a series of the links or discs $a$ are joined one to the other by placing the member $b^3$ attached as described to one of the said links or discs $a$, between the lugs $b$ and $b^1$ of another of the said links or discs $a$, and connecting said overlapping parts by means of a pin $d$, (Fig. 6); thus each of the links or discs $a$ is adapted to have a vertical axial movement about the said pin $d$ as well as a horizontal axial movement about the pin $b^2$ as hereinbefore mentioned.

Referring to Fig. 3, in order to carry the series of links or discs $a$, I provide a suitable framework $b^4$ which may be a light casting or such like, and the inner edges of the upper portion of this said framework $b^4$ are bevelled to allow the links or discs $a$ to ride therein. Mounted on this framework by means of suitable brackets, such as, for example, $a^1$, is a strip of suitable material $a^2$, brass for example, which prevents the possibility of any articles which may be carried by the conveyer from falling off. The framework $b^4$ may be supported by means of suitable pedestals or stands, such as, for example, $b^5$, and between these said pedestals or stands $b^5$ may be lengths of angle iron such as $b^6$, for the purpose of taking the weight of the conveyer links or discs $a$ as they return under the framework $b^4$ from the discharge to the loading end.

Referring to Fig. 4, and Fig. 7, and as hereinbefore mentioned, this conveyer is adapted to travel round corners, and this is effected by means of the idle wheels $c^1$ and $c^2$ which are suitably mounted on a spindle $c^3$, which is in turn carried by a bracket $c^4$, the said bracket $c^4$ being secured by means of bolts or other such means to the hereinbefore mentioned framework $b^4$. At the loading and discharge ends, and at the corners of the conveyer, the said framework may be deeper, and have a light casting or such like, such as $b^7$, attached, to give guidance to the lower links or discs $a$; and the arrangement is such that, as the upper links or discs $a$ turn round the corner, the top wheel $c^1$, into which they are grooved by virtue of the bevelling, turns also; similarly, the lower links or discs $a$ turn about, and with the lower wheel $c^2$, only, since they are returning, in the opposite direction to the upper links or discs $a$ and the wheel $c^1$. In order to give smooth movement to the said wheels $c^1$ and $c^2$, they may be mounted on suitable bearings such as $a^3$ and $a^4$.

As the links or discs $a$ turn about the idle wheels $c^1$ and $c^2$ the tendency of the said links or discs $a$ to rise is checked by the bevelling on the said links or discs $a$ and the framework $b^4$. As hereinbefore mentioned, the discs or links $a$ are each adapted to move with a horizontal axial movement about a pin $b^2$, and this movement, and the fact that each link or disc is adapted to ride in the cut-out portion of its adjacent link or disc, enables the said links or discs to adjust themselves as they move around bends and corners.

At each end of the conveyer (Fig. 6), the links or discs $a$ are adapted to pass over a suitable toothed wheel $c^5$, which is mounted in suitable bearings on a shaft $c^6$, the said toothed wheel $c^5$ engaging with a boss $b^8$ on the member $b^3$ of the links or discs $a$, as hereinbefore mentioned the said links or discs $a$ being enabled to turn with a hinging vertical movement about the pin $d$, as hereinbefore described.

At one end of the conveyer, preferably the discharge end, the hereinbefore mentioned shaft $c^6$ which carries the sprocket wheel $c^5$ may be extended, and a pulley $d^1$ (Fig. 5) may be mounted thereon, and this said pulley $d^1$ may be driven by any suitable means; the arrangement being such that the pulley when driven turns the shaft $c^6$ upon which is mounted the toothed wheel $c^5$, the teeth on the said wheel engaging with, and giving motion, to the said links or discs $a$. Although the conveyer is described herein as being driven through a pulley, any other suitable arrangement may be used if so desired, providing it acts in the manner substantially as described herein.

At the other end of the conveyer, the hereinbefore mentioned shaft $c^6$, which carries the sprocket wheel $c^5$, may be mounted in adjustable bearings as $d^2$ (Fig. 5) so that the tension of the conveyer may be altered if so desired.

What is claimed is:—

1. In a conveyer, the combination of a chain including links connected to have relative rocking movement about two axes extending substantially at right angles to each other, a series of flights, one attached to each link and comprising a disc-like body having a bevelled edge and provided with an arc-shaped peripheral recess which receives a portion of the next flight in the series, and parallel guideways engaging the bevelled edges of the flights at opposite sides of the operative run of the conveyer.

2. In a conveyer, the combination of an endless chain including links connected to have relative rocking movement about both vertical and horizontal axes, a plate-like flight attached to each link to rotate about the said vertical axis of the link and to turn with the link about the said horizontal axis, said flight having a bevelled edge and an arc-shaped peripheral recess which receives a portion of the next flight in the series, a driving sprocket engaging the links of the chain, and a freely rotatable guide wheel mounted to turn about a vertical axis at points intermediate the ends of the operative run of the conveyer and having a bevelled edge cooperating with the bevelled edges of the flights, for the purpose described.

3. In a conveyer, the combination of an endless chain including links connected to have relative rocking movement about both vertical and horizontal axes, a plate-like flight attached to each link to rotate about the said vertical axis of the link and to turn with the link about the said horizontal axis, said flight having a bevelled edge and an arc-shaped peripheral recess which receives a portion of the next flight in the series, a driving sprocket engaging the links of the chain, a freely rotatable guide wheel mounted to turn about a vertical axis at points intermediate the ends of the operative run of the conveyer and having a bevelled edge cooperating with the bevelled edges of the flights, and parallel guideways cooperating with the bevelled edges of the flights at points on opposite sides of said guide wheel.

4. In a conveyer, the combination of a chain comprising a series of link connecting pieces each having an eye adjacent one end and provided adjacent its other end with a bore, the axis of which extends substantially at right angles to the axis of said eye, a series of flight bearing links each comprising a plate-like body having on its lower face a stud that extends through and is rotatable in the said eye of one connecting piece and means extending across the said bore in the next succeeding connecting piece in the series, and apertured in alignment with said bore, a portion of the plate-like body of each link being cut away to provide an arc-shaped recess which will receive a portion of the next succeeding link in the series, and pins extending through said bores and connecting contiguous links of the chain through said connecting pieces.

5. In a conveyer, the combination of a chain comprising a series of link connecting pieces each having an eye adjacent one end and provided adjacent its other end with a bore the axis of which extends substantially at right angles to the axis of the said eye, a series of flight bearing links each comprising a disc-like body having on one face a stud that extends through and is rotatable in the said eye of one connecting piece and means extending across the bore in the next succeeding connecting piece in the series and apertured in alignment with said bore, each disc-like body having a bevelled peripheral edge substantially concentric with the axis of said stud and being cut away to provide an arc-shaped recess which will receive a portion of the next succeeding disc-like body in the series, and pins extending through said bores and connecting contiguous links in the chain through said connecting pieces.

6. In a conveyer, a chain composed of alternately arranged links and connecting pieces, each connecting piece being a rigid unitary piece, vertical pivotal connections at one end of each connecting piece connecting the same to one adjacent link, horizontal pivotal connections at the other end of each connecting piece connecting the same to the other adjacent link, each link having a flight in the form of a disk-like body provided with an arc-shaped peripheral recess which receives a portion of the flight of the next link in the series, in combination with parallel guideways engaging the edges of the flights at opposite sides of the operative run of the conveyer.

7. In a conveyer, an endless chain composed of alternately arranged links and connecting pieces, each connecting piece being a unitary rigid piece, vertical pivotal connections at one end of each connecting piece connecting the same to one adjacent link, horizontal pivotal connections at the other end of each connecting piece connecting the same to the next link, each link having a plate-like flight rotatable with it about the axis of the vertical pivotal connection and turning with it about the axis of the horizontal pivotal connection, each said flight having an arc-shaped peripheral recess which receives a portion of the next flight in the series, in combination with a sprocket for driving the chain and a freely rotatable guide wheel mounted to turn about a vertical axis at points intermediate the ends of the operative run of the conveyer and cooperating with the edges of the flights for the purpose described.

8. In a conveyer, the combination of an endless chain including links connected to have relative rocking movement about both vertical and horizontal axes, a plate-like flight attached to each link to rotate about the said vertical axis of the link and to turn with the link about the said horizontal axis, said flight having an arc-shaped peripheral recess which receives a portion of the next flight in the series, a driving sprocket engaging the links of the chain, a freely rotatable guide wheel mounted to turn about a vertical axis at points intermediate the ends of the operative run of the conveyer and having an edge cooperating with the edges of the flights, and parallel guideways cooperating with the edges of the flights at points on opposite sides of said guide wheel.

9. In a conveyer, the combination of a chain composed of alternately arranged links and connecting pieces, each connecting piece between its two companion links being a unitary rigid piece pivotally connected to one companion link to have relative rocking movement about one axis and pivotally connected to the other companion link to have relative rocking movement about another axis, said axes standing substantially at right angles to each other and there being one pair of said axes, and only one pair, for each link, and a flight on each link having the form of a disk-like body provided with an arc-shaped peripheral recess which receives a convex portion of the flight on the next link in the series, the disk-like bodies having equal range of rotation about one set of said axes and equal range of rotation about the second set of said axes.

10. In a conveyer, the combination of a chain having alternately arranged links and connecting pieces, each connecting piece between its two companion links being a unitary rigid piece pivotally connected to one companion link to have relative rocking movement about a horizontal axis and pivotally connected to the other companion link to have a relative rocking movement about a vertical axis, there being only one horizontal axis and one vertical axis for each link, and a flight on each link having the form of a disk-like body provided with an arc-shaped peripheral recess which receives a convex portion of the flight of the next link of the series, all of the disk-like bodies having the same range of vertical rotation, each about its own horizontal axis.

11. In a conveyer, the combination of a chain having alternately arranged links and connecting pieces, each connecting piece between its two companion links being a unitary rigid piece pivotally connected to one companion link to have relative rocking movement about a horizontal axis and pivotally connected to the other companion link to have a relative rocking movement about a vertical axis, there being only one horizontal axis and one vertical axis for each link, and a flight on each link having the form of a disk-like body provided with an arc-shaped peripheral recess which receives a convex portion of the flight of the next link of the series, all of the disk-like bodies having the same range of horizontal rotation, each about its own vertical axis.

12. In a conveyer, the combination of a chain and flights secured thereto, each flight comprising a disc-like body provided with an arc-shaped peripheral recess which receives a convex portion of the next flight in the series and the chain comprising substantially U-shaped connecting members alternately with said flights, each said connecting member having horizontal pivot openings near one end and a vertical pivot opening near the other end, a pivot pin at the center of each disc-like body, operatively positioned in the said vertical pivot opening in the next U-shaped connecting member, lugs extending from said disc-like bodies, a pair for each said body and located near the peripheral recess of said body, and a horizontal pivot pin extending through said lugs and through the horizontal pivot openings of the said U-shaped connecting member.

13. In a conveyer, the combination of a chain and flights secured thereto, each flight comprising a disc-like body provided with an arc-shaped peripheral recess which receives a convex portion of the next flight in the series and the chain comprising substantially U-shaped connecting members alternately with said flights, each said connecting member having horizontal pivot openings near one end and a vertical pivot opening near the other end, a pivot pin integral with and at the center of each said disc-like body, operatively positioned in the vertical pivot opening in the next U-shaped connecting member, lugs extending from said disc-like bodies, a pair for each said body and located near the peripheral recess of said body, and a horizontal pivot pin extending through said lugs and through the horizontal pivot openings of the said U-shaped connecting member.

14. In a conveyer, the combination of chain links having flights secured thereto, each flight comprising a disc-like body provided with an arc-shaped peripheral recess which receives a convex portion of the next flight of the series, and link connecting pieces, each being substantially U-shaped and having horizontal pivot openings near one end, and a vertical pivot opening, near the other end, a pivot pin at the center of each disc-like body and operatively positioned in the vertical pivot opening in the next U-shaped connecting member, lugs extending from said disc-like bodies, a pair for each said body and located near the peripheral recess of said body, a horizontal pivot pin extending through said lugs and through the horizontal pivot openings in said U-shaped member, and a tubular member surrounding said horizontal pivot pin for engaging the teeth of a driving sprocket wheel.

15. In a conveyer, the combination of chain links having flights secured thereto, each flight comprising a disc-like body provided with an arc-shaped peripheral recess which receives a convex portion of the next flight of the series, and link connecting pieces, each being substantially U-shaped and having horizontal pivot openings near one end, and a vertical pivot opening near the other end, a pivot pin at the center of each disc-like body and operatively positioned in the vertical pivot opening in the next U-shaped connecting member, lugs extending from said disc-like bodies, a pair for each said body and located near the peripheral recess of said body, and a horizontal pivot pin extending through said lugs and through the horizontal pivot openings in said tubular member.

Dated this 26th day of September, 1928.

E. C. HOPKINS.